Patented Dec. 20, 1949

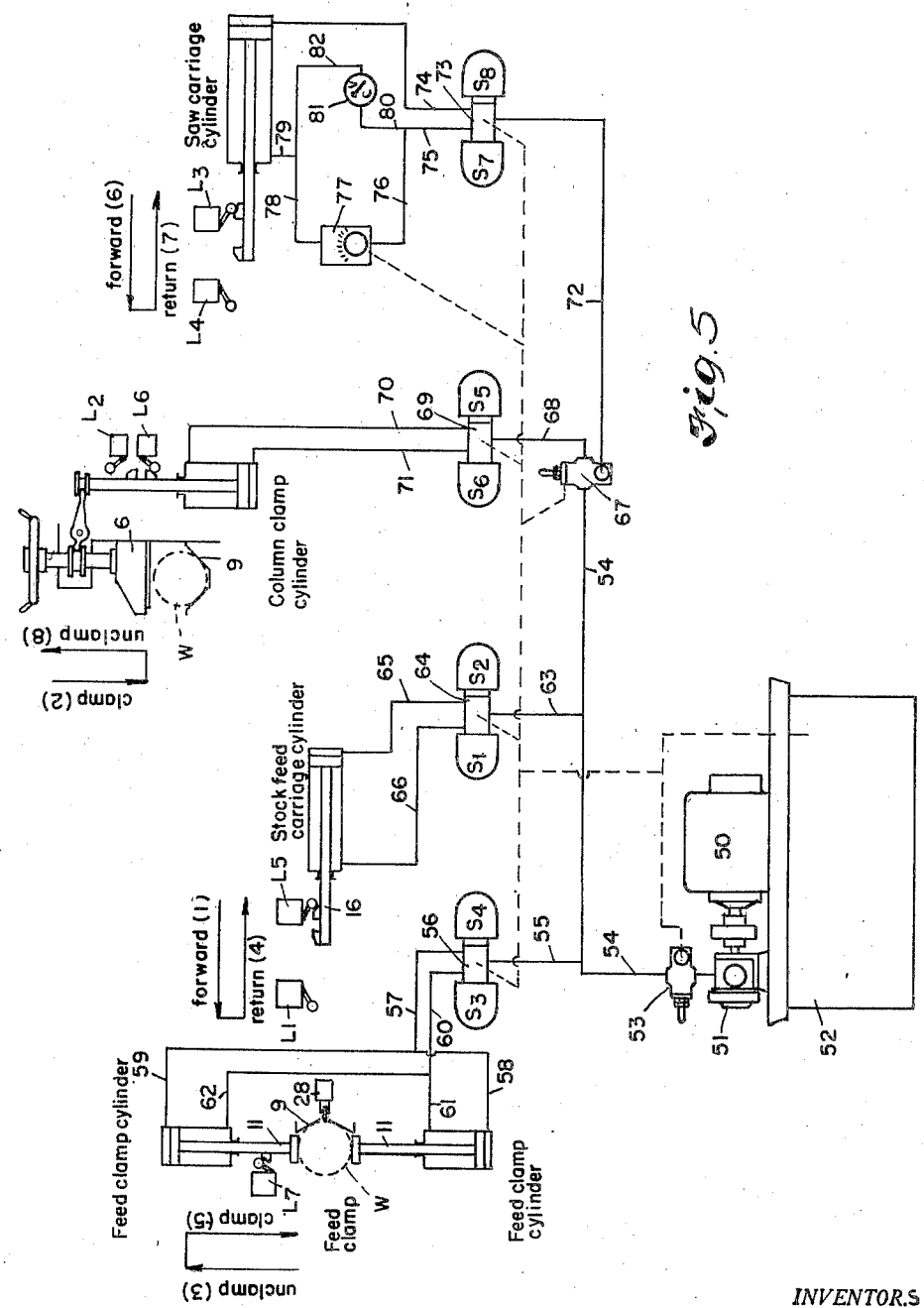

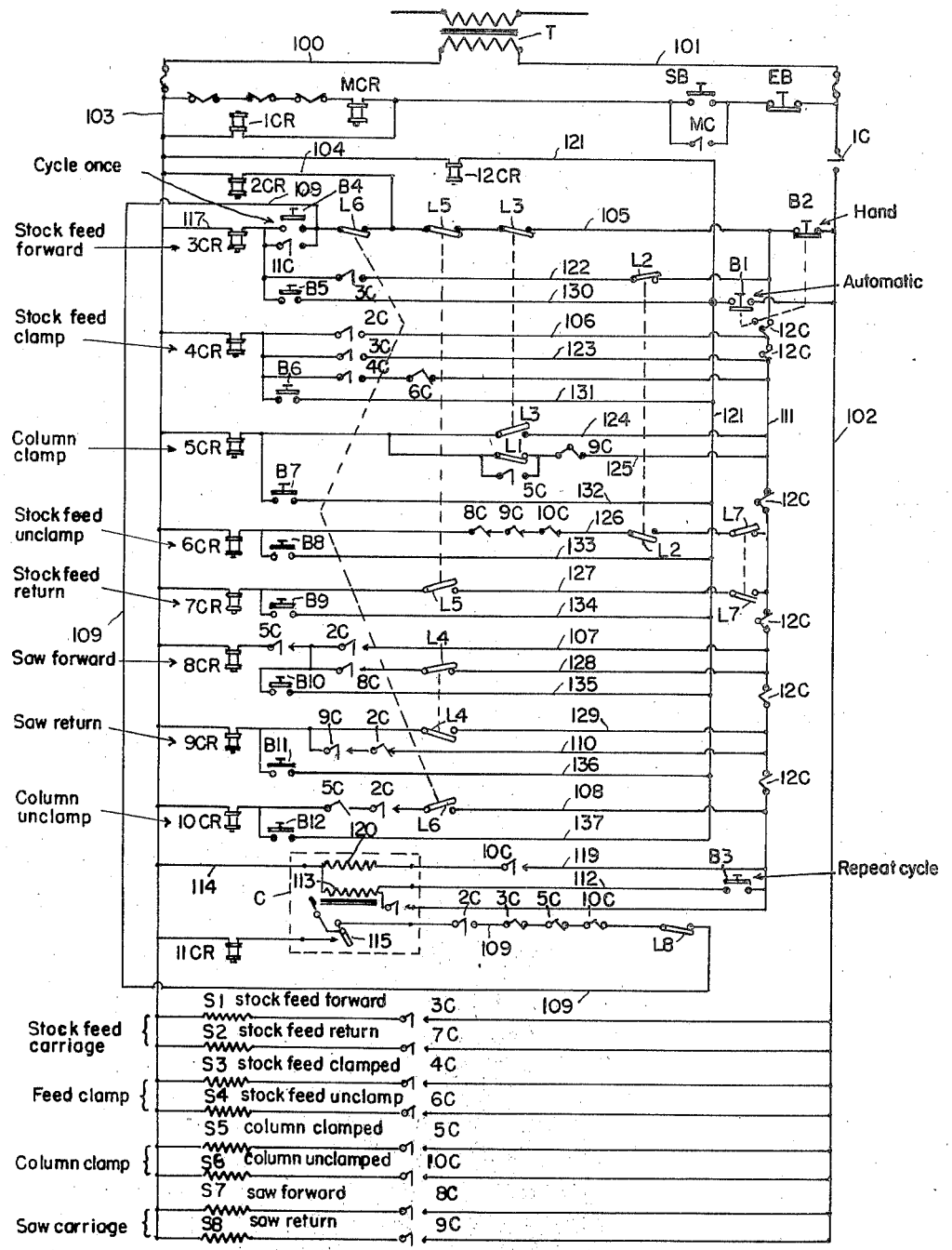

2,491,901

UNITED STATES PATENT OFFICE 2,491,901

AUTOMATIC METAL SAWING MACHINE

Johan Gustaf Moohl and Lee W. McClellan, Cleveland Heights, Ohio, assignors to The Motch & Merryweather Machinery Co., Cleveland, Ohio, a corporation of Ohio Application September 27, 1944, Serial No. 555,962

7 Claims. (Cl. 29—69)

The present invention relates to a metal cutting off or sawing machine which is automatically operated in performing the primary functions of feeding the stock metal to its desired position in the path of the saw, clamping the stock, and traversing the saw through the stock.

The general object and nature of our invention is to provide such an automatic sawing machine in which each one of the component movements going to make up the cycle of operations is definitely and positively co-related with the other, so that there is no likelihood of one moving part functioning in other than its proper sequence, thus assuring a reliability and safety of operation both for the machine and the work.

A further object of the invention is to provide hydraulic mechanisms for the prime movement of the principal component parts of the machine, and to combine therewith an electrically actuated control system, whereby certain predetermined positions of the moving elements in the cycle of operations must be satisfied before the next succeeding operation can take place. Briefly outlined, our invention provides hydraulic pressure cylinders connected individually to the stock feed clamp, to the stock feed table, to the stock clamp for holding the metal stock in fixed position during the sawing operation, and to the saw carriage; these hydraulic cylinders are in turn controlled by electric solenoid actuated valves and the latter controlled by an electric relay system and limit switches.

Another object of our invention is to provide an automatic stock feed clamping and stock feeding device of novel and improved construction wherein different sizes or diameters of metal stock can be conveniently handled with but a simple adjustment for determining the length of the stock feed movement. There is also provided in such stock feeding device, positive, mechanical limit stop abutments for preventing "overrun" of the stock feed carriage, so as to hold the length of stock being fed accurately to prescribed dimension.

In general, our invention accomplishes the objective of providing an automatic metal sawing machine which is reliable and dependable in the performance of its sequence of operations, performs the cycle of stock feeding and sawing operations in a greatly reduced period of time, and thus contributes to an efficient and high rate of production.

Additional objects and advantages of the invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the inventions, these being indicative, however, of but a few of the various ways in which the principle of the invention may be employed.

In said annexed drawings—

Fig. 5 is a diagram of the hydraulic system, including the solenoid valves and limit switches; and Fig. 6 is a diagram illustrating the electric relay and control system.

Figure 1:
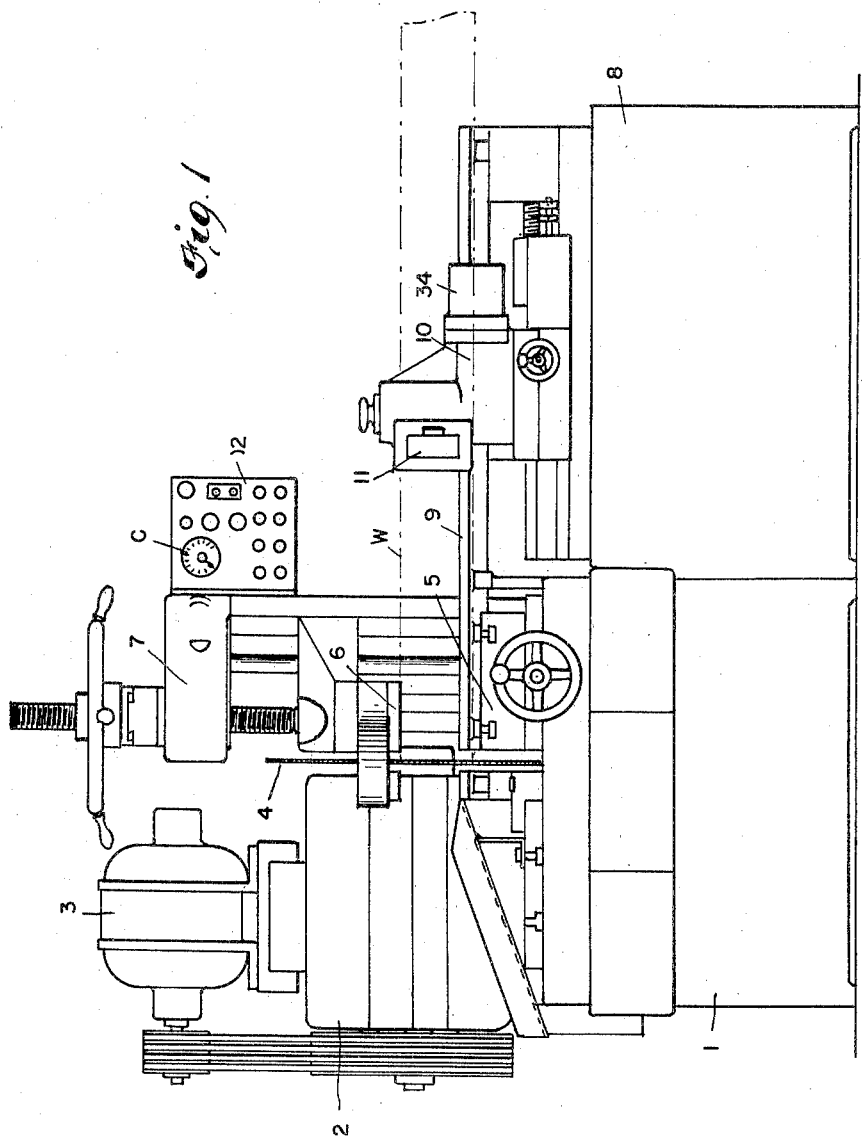
Fig. 1 is a front elevational view of an automatic sawing machine embodying the principle of our invention.

Now referring more particularly to Figs. 1–4, incl., of the drawing, our invention is shown as being applied to a metal sawing machine of the same general type as that found in J. G. Moohl U. S. Patents Nos. 2,327,920 and 2,327,921. The sawing machine proper consists of the main machine base 1 upon which there is slidably mounted the saw carriage 2 which in turn carries the saw drive motor 3 and circular saw blade 4. The base 1 also mounts the work holding clamp or vise comprising the lower fixed jaw 5 and the upper, vertically movable jaw 6, the latter being carried by the column 7.

The feed table base 8 is mounted on the right-hand side of the sawing machine, and supports the stock feed trough 9 which also extends over the top of the lower clamping vise jaw 5 and is attached to the latter. The stock feed carriage 10 is slidably mounted on the table base 8 and carries the opposed feed clamp jaws 11. An electrical control panel 12 is mounted in a convenient position for access by the operator, alongside the column 7.

From the foregoing description it should now be appreciated that the operation, in general, to be performed by our machine, is as follows:

The workpiece or metal stock W, such as a bar, rod or tube, is placed upon the trough 9, clamped between the feed clamp jaws 11, moved forward or in a left-hand direction by corresponding movement of the feed carriage 10 to a position in the path of the saw 4 corresponding to the desired length of material to be cut off; whereupon the column clamp jaw 6 moves down to grip the stock W, and the saw carriage 2 and saw move forward to perform the cut. In the meantime, the stock feed clamping jaws 11 have been retracted and the feed carriage 10 has moved back (in a right-hand direction with respect to Fig. 1) to its starting position, and after the completion of the cut, the column clamp 6 moves upwardly to release the stock W. and the cycle is repeated.

Figure 2:
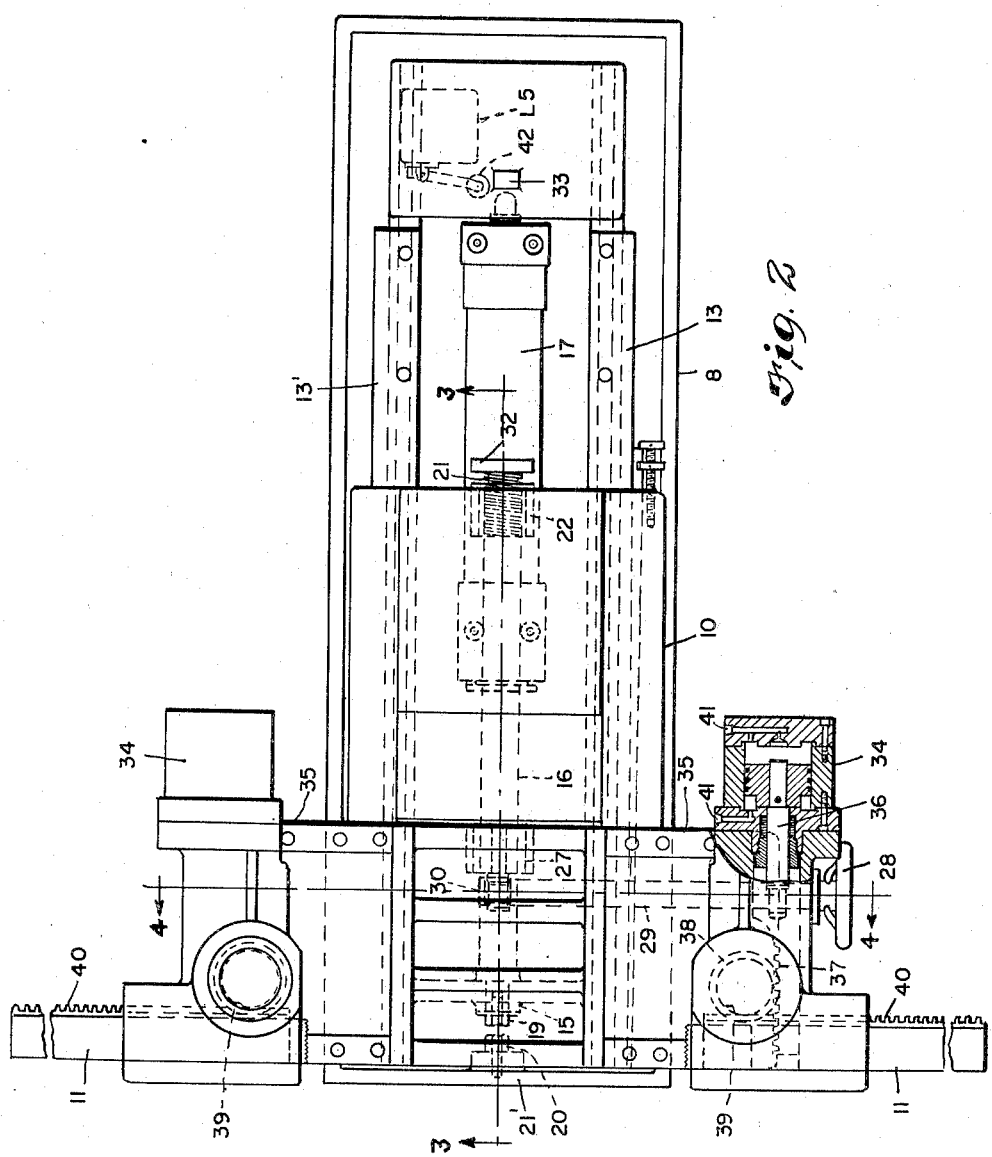
Fig. 2 is a top plan view, partially in section, of the stock feeding carriage and table.
Figure 3:
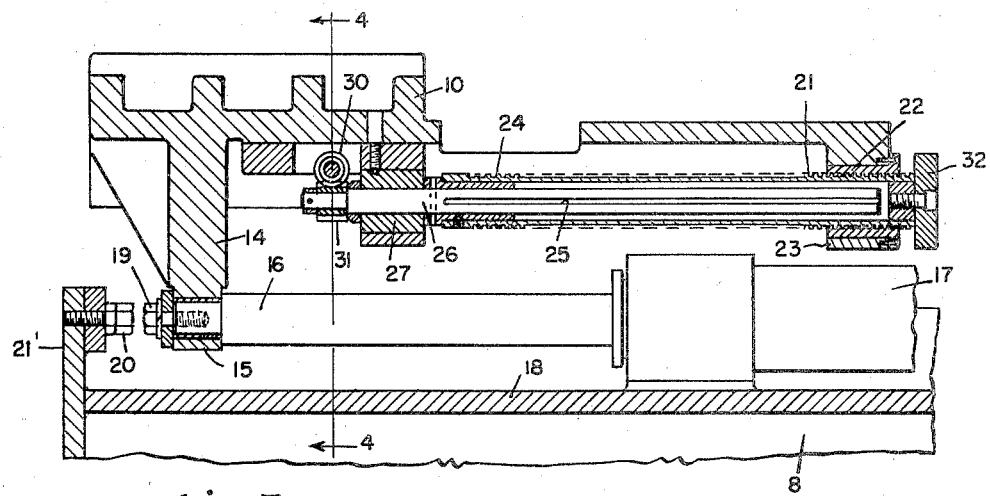
Fig. 3 is a vertical, longitudinal sectional view of a portion of the stock feeding carriage and table.
Figure 4:
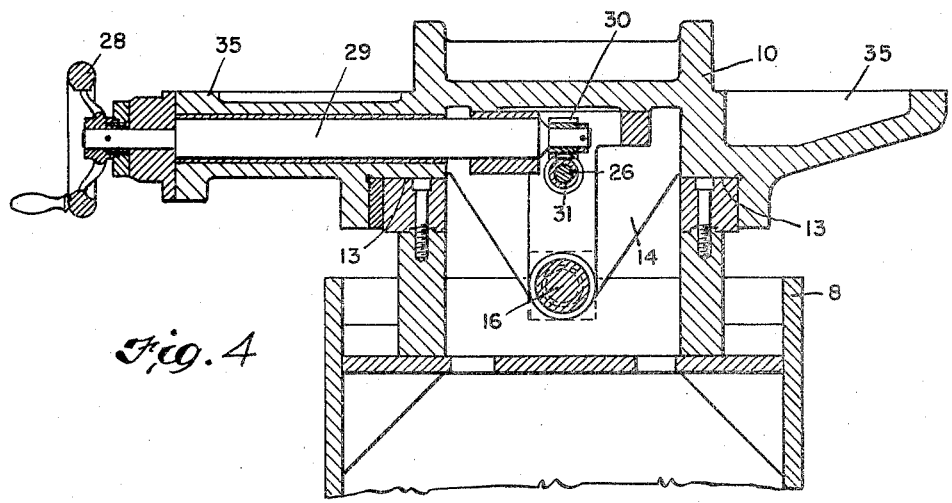
Fig. 4 is a sectional view taken upon a plane transverse to Fig. 3 and substantially along line 4—4 thereof.

The detailed structure of the stock feeding mechanism is best shown in Figs. 2, 3 and 4. In the top plan view of Fig. 2, the stock supporting trough 9 has been omitted in order to facilitate illustration. The feed carriage 10 is mounted on the slideways 13 on the top of the base 8. The boss 14 projects downwardly from the underside of the carriage 10 and is attached, as indicated at 15, to the end of the piston rod 16 whose piston works in the hydraulic pressure cylinder 17. The cylinder 17 is fixedly mounted on the top wall 18 of the base 8.

The left-hand or outer end of the piston rod 16 carries an abutment screw 19 which is adapted to contact against the opposite, adjustable abutment screw 20 on the vertical end plate 21' of the base 1.

The carriage 10 also carries on its underside an adjustable screw shaft 21 which threadably engages with the nut 22, held against rotation in the downwardly depending boss 23. The left-hand end of the shaft 21 has fastened to it an inner, slide bearing sleeve 24 which is slidably keyed to the longitudinal slot or key-way 25 in the shaft 26. The shaft 26 in turn is rotatably supported in the boss 27 mounted on the underside of the carriage 10. A hand wheel 28 is located at an accessible point on the front, outer side of the carriage 10 and is connected by means of the shaft 29 and the worm 30 and gear 31, to the shaft 26. The right-hand end of the threaded shaft 21 mounts an abutment plate 32 which is adapted to contact with the fixed abutment 33 on the right-hand or outer end of the base 8.

It will thus be seen that operation of the hand wheel 28 is effective to adjust the distance that the abutment plate 32 projects from the feed carriage 10, and correspondingly to regulate the distance that the feed carriage 10 can be moved in a backward, or right hand direction, thus determining the length of cut-off stock.

A pair of hydraulic pressure pistons 34 are mounted on the lateral wings 35 of the carriage 10. The piston rod 36 of the piston in the cylinders 34 is connected to the gear rack 37 meshing with the pinion 38 on the vertical shaft 39. The pinion 38 also is of sufficient longitudinal extent to engage with the gear rack 40 on the feed clamp bar 11. Ports 41 leading to the opposite ends of the cylinder 34 are connected by means of suitable flexible tubing lines (not shown) which in turn are connected to an electric solenoid actuated control valve, as will be subsequently described in connection with Fig. 5.

Thus, it will be seen that actuation of the piston in the cylinder 34 operates to move the gear rack 37 in and out, and that correspondingly both of the cylinders 34 thus actuate the opposed feed clamp bars toward and away from each other to clamp or release the workpiece.

The roller 42 on the end of the actuating lever of the limit switch $L_5$ normally occupies a position slightly in advance of the abutment 33, as shown in Fig. 2, and is adapted to be contacted by the abutment plate 32, to actuate the limit switch $L_5$, just as the elements 32 and 33 come into contact.

*Hydraulic operating and control system*

In addition to the feed clamping jaws 11 connected to the hydraulic cylinders 34 and the feed carriage 10 connected to the cylinder 17 for effecting the respective power movements thereof, the saw carriage 2 and the column clamp 6 are also connected to hydraulic pressure cylinders which are housed within the machine base 1 and the column 7, and hence are not shown in Fig. 1. For an illustration of the detailed structure of the prime moving cylinders connected to the saw carriage 2 and column clamp 6, reference is made to J. G. Moohl U. S. Patent No. 2,327,920.

In Fig. 5, the cylinders actuating the feed clamp bars 11, the stock feed carriage cylinder, the column clamp cylinder and the saw carriage cylinder are denoted by appropriate legends. The piston rods of these cylinders are adapted to contact the actuating levers of limit switches, as illustrated in Fig. 5 by cam abutments on the rods. Such representation is made by way of convenience in illustration, and is not intended to show the precise manner in which the movement of the pistons and piston rods in the respective prime moving cylinders is so transmitted to the electric limit switches as to cause the actuation of the latter. It should be obvious to those skilled in the art that several different detailed mechanical means can be employed for connecting the movement of the piston rods to the electric limit switches, other than those which are diagrammatically shown in Fig. 5.

It will thus be seen that the piston rods of the feed clamp cylinders are adapted to actuate the limit switch $L_7$ at the point of their inward or unclamped position; the piston rod of the stock feed carriage cylinder adapted to actuate the limit switch $L_1$ at its forward feed position and the limit switch $L_5$ at its return or retracted position; the rod of the column clamp cylinder adapted to actuate the limit switch $L_6$ at its outward or unclamped position and the limit switch $L_2$ at its inward or clamped position; and the piston rod of the saw carriage cylinder adapted to actuate the limit switches $L_4$ and $L_3$ at its forward and return positions, respectively. The limit switch $L_8$ is adapted to be actuated by the workpiece or stock W resting in the trough 9 and to be moved to non-actuated or open position when the end of the stock has passed a predetermined minimum length point in the supporting trough 9, for example at a point corresponding to the maximum retracted or return position of the stock feed carriage 10.

The electric motor 50 drives the hydraulic pressure pump 51 whose intake is connected to the reservoir 52. The outlet or discharge side of the pump 51 passes through the pressure regulating valve 53 to the feed line 54 which is in turn connected to the branch line 55 leading to the four-way, electric solenoid actuated valve 56. The outlet line 57 from the four-way valve 56 connects to the head end of each of the feed clamp cylinders, through the lines 58 and 59. The other outlet line 60 from the valve 56 connects to the rod end of each of the feed clamp cylinders through the lines 61 and 62.

A second branch line 63 from the main feed line 54 leads to the four-way solenoid actuated valve 64, the outlet lines of which, 65 and 66, are connected to the head and rod ends, respectively, of the stock feed carriage cylinder.

The feed line 54 is connected to a second pressure regulating, or sequence, valve 67, one outlet of which is connected to the line 68 to the four-way solenoid valve 69. The outlets of the latter are in turn connected through the lines 70 and 71 to the rod and head ends, respectively, of the column clamp cylinder. The differential pressure outlet of the pressure regulating valve 67 is connected to the line 72 leading to the four-way solenoid 73. The pressure regulating valve 67 is so constructed and arranged as to require a predetermined minimum pressure to be attained in the lines 54 and 68 before said lines are connected to the line 72. This insures the actuation of the feed clamp, the stock feed carriage and column clamp prior to the actuation of the column clamp and in turn, the actuation of the latter prior to the movement of the saw carriage.

The four-way valve 73 is connected through the line 74 to the head end of the saw carriage cylinder. The other outlet line 75 from the valve 73 is connected through the line 76 to the variable volume regulating valves 77 and thence through the lines 78 and 79 to the rod end of the saw carriage cylinder. The line 80 connects through the check valve 81 in the line 82 to the line 79. Thus, the introduction of pressure to the rod end of the saw carriage cylinder is connected in parallel through the pressure regulating valve 77 and the check valve 81, the latter being so arranged as to permit flow from the line 75 to the line 79, but to prevent flow in the opposite direction. Thus, adjustment of the variable volume control valve 77 regulates the volume from the rod end of the saw carriage cylinder on the forward movement of the latter and hence serves as means for controlling the rate of saw feed movement.

As indicated by the dotted lines in Fig. 5, the several valves of the system have their exhaust ports connected to return lines leading to the reservoir 52. The four-way valves 56, 64, 69 and 73 are connected to and actuated by the electric solenoids indicated by the reference characters $S_1$ to $S_8$, inclusive, in Fig. 5. These latter solenoids are in turn actuated by electrical impulses, primarily controlled by actuation of the limit switches $L_1$ to $L_8$, inclusive, and through the medium of an electric circuit system which will now be described and is schematically represented in Fig. 6.

Electric control system

In the schematic representation of Fig. 6, the reference characters $L_1$ to $L_8$, inclusive, refer to the correspondingly marked limit switches in Fig. 5, and the characters $S_1$ to $S_8$, inclusive, refer to the correspondingly marked four-way valve-actuating solenoids of Fig. 5. The reference characters 1CR to 12CR, inclusive, refer to the actuating solenoids of control relays whose corresponding switch or contact points are marked 1C, 2C, etc., respectively. For the sake of simplicity and clarity in representation, the wiring connections between the control relay solenoids "—CR" and their contact points "—C" are not shown in Fig. 6. It will be understood, however, that as a single control relay CR is energized, it results in an opening or closing of its corresponding contact points, depending on whether the latter are represented as normally open or normally closed in the drawing.

In Fig. 6, electric power is introduced to the output lines 100 and 101 from the secondary of the transformer T. Upon operation of the starting switch button SB, the emergency switch button EB being normally closed, the circuit from the lines 100 and 101 is closed through the motor control relay MCR and the control relay 1CR. This results in closing of the relay contacts MC to start the necessary drive motor such as the saw drive motor 3, the hydraulic pump drive motor 50 and a coolant circulating motor (not shown) if the latter is so required. Simultaneously the relay contact 1C is closed, connecting the main vertical trunk line 102 to the horizontal branch lines at the foot of the diagram, in which the solenoids $S_1$ to $S_8$, inclusive, and the relay contacts 3 to 10 inclusive are connected in series with the other vertical, main trunk line 103.

Upon pressing the automatic operation switch button $B_1$, the throw of which is mechanically connected to the hand switch button $B_2$, thus closing the latter, the relay 2CR is energized by reason of the connection of line 104, through normally closed limit switches $L_5$ and $L_3$ and line 105. Upon energizing of the relay 2CR, its contact points 2C in lines 106, 107, 108 and 109 are closed, and its normally closed contact points 2C in line 110 are opened. Thus, the circuit from line 103 through relay 4CR to line 106, to line 111 to line 102 is closed, energizing relay 4CR which closes the latter's contact 4C in the horizontal line at the foot of the diagram, energizing solenoid $S_3$, and causing the stock feed jaws 11 to move to clamped position.

At this point, repeat cycle switch button $B_3$ is depressed, closing the circuit through line 112, the solenoid 113 of the electric, automatic counter C through line 114. The actuation of the solenoid 113 closes the switch points 115, thus closing the circuit in line 109 to line 105 (contact 2C in line 109 being previously closed). This actuates relay 11CR. Upon actuation of relay 11CR, its contact 11C in line 117 is closed after an interval of time regulated by the amount of air allowed to flow into the head end of pneumatic bellows 118, which in turn results in actuation of relay 3CR with the corresponding closing of its respective contacts 3C at the points denoted on the diagram.

At this stage, the conditions for starting the automatic operating cycle have been set up, namely:—the actuation of control relays 1CR, 2CR, 3CR, 4CR and 11CR. Since the contacts 4C and 3C in the solenoid lines at the foot of the diagram are closed, actuating solenoids $S_1$ and $S_3$ (cf. following table of operations), this results in movement of the stock feed clamp to clamped position and starting of the stock feed carriage on its forward movement, respectively. Hence, the cycle of operations begins.

Alternatively, and in the event that only one automatic cycle of operation of the machine is desired, the "cycle once" switch button $B_4$ may be depressed, connecting line 117 to line 105, to actuate relay 3CR. Whether only a single automatic cycle is desired to be performed, or a repeat number of cycles (as determined by the setting of the counter hand on the counter C), the machine begins its operations. Instead of literally tracing each subsequent step of operation during the cycle, the following table denotes the various positions of movement and actuation of the valve operating solenoids $S_1$ to $S_8$, inclusive, of the control relays 1CR to 12CR and of the limit switches $L_1$ to $L_8$, inclusive. From this table, each and every step of operation, and the conditions of actuation of the solenoids, the control relays and their contact points and the limit switches can be conveniently traced by reference to Fig. 6.

cident with step (14) in the foregoing table. This is effected by the closing of contact 10C in line 119 which energizes the counter solenoid 120.

It will also be noted that in the event that limit switch $L_8$ in line 109 is opened, viz., by the removal of the weight of the workpiece W holding it in closed position, that the entire operating cycle will be stopped, since closed position of the limit switch $L_8$, as will be seen from the above table, is a necessary requisite to each and every one of the steps of operation. Thus, if the machine is operating on "repeat cycle" and the hand of the automatic counter C set at more pieces to be cut off than there are available in the entire length of workpiece W, the latter on passing beyond the

| Step No. | 4-Way Valve Solenoids (X=Actuated) S1 to S8 | | | | | | | | Control Relays (X=Actuated) 1CR to 12CR | | | | | | | | | | | | Limit Switches (X=Closed) L1 to L8 | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 9 | 10 | 11 | 12 | 1 | 2 | 3 | 4 | 5 | 6 | 7 | 8 |
| (1) | X | X | | | | | | | X | X | X | X | | | | | | | X | | X | X | | | X | X | X | X |
| (2) | X | X | | | | | | | X | | X | X | | | | | | | | | | X | X | | | X | X | X |
| (3) | X | X | X | | | | | | X | | X | X | | | | | | | | | | X | X | | | | X | X |
| (4) | X | X | X | | | | | | X | | X | X | X | | | | | | | | | X | X | | | | X | X |
| (5) | | | X | X | | | | | X | | | | X | X | | | | | | | | X | X | | | | | X |
| (6) | | X | X | X | | | | | X | | | | | X | | | | | | | | X | | | | | | X |
| (7) | | X | X | X | | | | | X | | | | | X | | | | | | | | X | | | | | | X |
| (8) | | | X | X | | X | | | X | X | | X | | | | | | | | | | | X | | | X | X | X |
| (9) | | | X | X | | | X | | X | | | X | | | X | | | | | | | | X | | | X | X | X |
| (10) | | | X | X | | | | X | X | | | X | | | X | | | | | | | | | X | | X | X | X |
| (11) | | | X | X | | X | | | X | | | X | | | | | X | | | | | | X | | | X | X | X |
| (12) | | | X | X | X | | | | X | X | X | X | | | | | X | | | | | | X | | | X | X | X |
| (13) | | | X | X | | X | | | X | X | X | X | | | | | | | X | | | X | X | X | X | X | X | X |
| (14) | | | X | X | | | | | X | X | X | | | | | | | | | X | | X | X | X | X | X | X | X |
| (15) | | | X | X | | | | | X | X | X | X | | | | | | | | X | | X | X | X | X | X | X | X |
| (1) | X | X | | | | | | | X | X | X | X | | | | | | | | X | X | X | | | X | X | X | X |

The step numbers referred to in the above table are listed as follows:
(1) Conditions to start cycle.
(2) Stock feed cylinder starts forward.
(3) Stock feed cylinder gets forward.
(4) Column clamp starts down.
(5) Column clamp gets down.
(6) Stock feed clamp moves back.
(7) Stock feed cylinder starts return.
(8) Stock feed cylinder has returned.
(9) Saw carriage starts forward.
(10) Saw carriage gets forward.
(11) Saw carriage starts return.
(12) Saw carriage has returned.
(13) Column clamp starts up.
(14) Column clamp gets up.
(15) Time delay.
(1) Conditions to start cycle.

It will be noted that in step (15) a time delay is provided between the point of unclamping of the column clamp and step (1) when the conditions to start the cycle are again inaugurated. This is for the purpose of allowing a short interval between the time when the column clamp 6 releases the workpiece W and when the stock feed carriage begins to move forward, such time delay serving to control the amount of production to correspond with the speed of a production line in which the present automatic sawing machine is included. This time delay, it will be seen from the table above, is effected by a temporary de-energization of control relay 11CR. A very simple and expedient means which we have provided for accomplishing this objective is to retard the rate of movement of the armature of the relay 11CR, such as by the use of a pneumatic or hydraulic check.

The counter C is actuated during each cycle of operations, and at the point where the column clamp moves to unclamped position, namely, coinlimit switch $L_8$ in the feed trough 9, will permit the limit switch $L_8$ to open and thus stop the machine until a new length of stock is placed in feeding position.

In the event that it is desired to operate the stock feed carriage, the feed clamp, the column clamp or the saw carriage individually and independently of each other, i. e., to effect non-automatic operation, such as in the instance of setting up the machine or for the purpose of adjusting any one of the individual moving parts, the hand switch button $B_2$ is depressed. This results in closing the switch $B_1$ which in turn closes the circuit through line 121 to line 102, thus energizing relay 12CR, whereupon all of the switch contacts 12C of the latter relay in line 111 are moved from normally closed, to open position. This operation, it will be seen, has the net result of disconnecting all of the energizing lines for the solenoid actuating control relays 3CR to 10CR, inclusive. Thus, the opening of switch $B_2$ and the opening of contacts 12C in line 111 open lines 105 and 122 from relay 3CR; lines 106 and 123 from relay 4CR; lines 124 and 125 from relay 5CR; line 126 from relay 6CR; line 127 from relay 7CR; lines 107 and 128 from relay 8CR; lines 129 and 110 from relay 9CR; and line 108 from relay 10CR.

Thereupon, by depressing the individual hand switch buttons $B_5$ to $B_{12}$, inclusive, in lines 130 to 137, inclusive, respectively, the circuits through relays 3CR to 10CR are individually closed through line 121. Furthermore, closing an individual hand operated button will operate only the proper relay which will prevent changing other components.

The operating switch buttons SB, EB, $B_1$ to $B_{12}$, inclusive, together with the dial and setting hand of the automatic counter C, are all conveniently mounted upon the panel 12 shown in Fig. 1.

The dotted lines between the limit switches L2, L3, L4, L5, L6 and L7 denote that these switches are double acting and mechanically interconnected, just as in the case of the switch button B1 and B2.

It will thus be seen that we have provided an automatic sawing machine and a combined hydraulic and electrical control system for effecting the automatic operating cycle, wherein each and every operating step must needs be completely performed before the next succeeding operating step can take place. This contributes to the efficiency and reliability of the automatic operation of the machine, as well as to the safety of its mechanical parts and of the operator. By the combination of electric limit switches actuated by mechanical movement of the component parts of the machine, which switches in turn control the actuation of the electric solenoids operating the hydraulic valves, a rapidity of operation of the complete cycle is achieved, so that the productive operation of the machine as a whole is vastly increased. Furthermore, as will be seen from the foregoing description, our combined hydraulic and electric system permits a flexibility of operation ranging from a number of repeat cycles limited only by the length of stock fed to the machine, to separate and independent movement of any one particular moving part of the machine.

Other modes of applying the principle of the invention may be employed, change being made as regards the details described, provided the features stated in any of the following claims or the equivalent of such be employed.

We therefore particularly point out and distinctly claim as our invention:

1. An automatic metal sawing machine comprising a movable saw carriage and circular saw carried thereby, a stock feed conveyor, a clamping vise for holding the stock to be sawed, hydraulic cylinders and pistons therein connected to each said carriage, conveyor and vise for moving such last-named elements back and forth, a pair of electric limit switches located adjacent each of said pistons and adapted to be alternately contacted thereby at the opposite extremities of movement of each of said pistons, a pair of opposed stock feed clamps, with a hydraulic cylinder and piston for each of said clamps, said feed clamps and said so-connected cylinders and pistons being carried by said conveyor, an electric limit switch adapted to be contacted by one of said pistons connected to one of said feed clamps at the unclamped position of the latter, electric solenoid actuated valves hydraulically connected to said cylinders and electrically connected to said switches whereby said valves are operated in a predetermined sequence dependent upon the time of actuation of said switches, and electric solenoid actuated valves hydraulically connected to each of said cylinders and electric relays interconnecting said switches and the solenoids of said valves whereby the latter are operated in a predetermined sequence depending upon the time of actuation of said switches and of said relays.

2. An automatic metal sawing machine comprising a movable saw carriage and circular saw carried thereby, a stock feed conveyor, a clamping vise for holding the stock to be sawed, hydraulic cylinders and pistons therein connected to each said carriage, conveyor and vise for moving such last-named elements back and forth, a pair of electric limit switches located adjacent each of said pistons and adapted to be alternately contacted thereby at the opposite extremities of movement of each of said pistons, a pair of opposed stock feed clamps, with a hydraulic cylinder and piston for each of said clamps, said feed clamps and said so-connected cylinders and pistons being carried by said conveyor, an electric limit switch adapted to be contacted by one of said pistons connected to one of said feed clamps at the unclamped position of the latter, electric solenoid actuated valves hydraulically connected to said cylinders and electrically connected to said switches whereby said valves are operated in a predetermined sequence dependent upon the time of actuation of said switches, electric solenoid actuated valves hydraulically connected to each of said cylinders and electric relays interconnecting said switches and the solenoids of said valves whereby the latter are operated in a predetermined sequence depending upon the time of actuation of said switches and of said relays, and an electric time delay relay connected to the limit switch actuated by the unclamping movement of said vise and to the limit switch actuated by the backward movement of said conveyor thereby to impart a time interval between repeat cycles of operation of said machine.

3. In a metal sawing machine, stock feeding mechanism for conveying predetermined lengths of stock to the machine to be cut off, comprising a supporting table positioned adjacent said machine, a slidable carriage mounted on said table, opposed stock clamping jaws on said carriage reciprocable in a direction transverse to that of the movement of said carriage, pressure cylinders and pistons mounted on said carriage with their longitudinal axes parallel to the direction of carriage movement, and rack and pinion means connecting said pistons to said clamping jaws.

4. In a metal sawing machine, stock feeding mechanism for conveying predetermined lengths of stock to the machine to be cut off, comprising a supporting table positioned adjacent said machine, a stock supporting trough mounted on top of said table, a slidable carriage mounted adjacent said trough, opposed stock clamping jaws on said carriage and reciprocable in a direction transverse to, and across the top of, said trough, pressure cylinders and pistons mounted on said carriage with their longitudinal axes parallel to the direction of carriage movement, and rack and pinion means connecting said pistons to said clamping jaws.

5. In a metal sawing machine, stock feeding mechanism for conveying predetermined lengths of stock to the machine to be cut off, comprising a supporting table positioned adjacent said machine, a slidable carriage mounted on said table, opposed stock clamping jaws on said carriage reciprocable in a direction transverse to that of the movement of said carriage, fixed limit stop abutments on said table adapted to be contacted by said carriage, a screw shaft threadably engaging said carriage and adapted to contact one of said abutments, a pressure cylinder and piston connected to said carriage, an electric solenoid-actuated valve for controlling the operation of said cylinder, and electric limit switches connected to the solenoid of said valve and adapted to be contacted by said carriage at its extremities of movement.

6. In a metal sawing machine, stock feeding mechanism for conveying predetermined lengths of stock to the machine to be cut off, comprising a supporting table positioned adjacent said machine, a slidable carriage mounted on said table, opposed stock clamping jaws on said carriage reciprocable in a direction transverse to that of the movement of said carriage, fixed limit stop abutments on said table adapted to be contacted by said carriage, a screw shaft threadably engaging said carriage and adapted to contact one of said abutments, and means on said carriage for adjustably regulating the longitudinal position of said screw shaft with respect to said carriage.

7. In a metal sawing machine, stock feeding mechanism for conveying predetermined lengths of stock to the machine to be cut off, comprising a supporting table positioned adjacent said machine, a slidable carriage mounted on said table, opposed stock clamping jaws on said carriage reciprocable in a direction transverse to that of the movement of said carriage, fixed limit stop abutments on said table adapted to be contacted by said carriage, a screw shaft threadably engaging said carriage and adapted to contact one of said abutments, means on said carriage for adjustably regulating the longitudinal position of said screw shaft with respect to said carriage, a pressure cylinder and piston connected to said carriage, an electric solenoid-actuated valve for controlling the operation of said cylinder, and electric limit switches connected to the solenoid of said valve and adapted to be contacted by said carriage just prior to the contact of the latter with said abutments.

JOHAN GUSTAF MOOHL.
LEE W. McCLELLAN.

REFERENCES CITED

The following references are of record in the file of this patent:

UNITED STATES PATENTS

| Number | Name | Date |
|---|---|---|
| 627,385 | Brockie | June 20, 1899 |
| 2,163,967 | Strawn | June 27, 1939 |

FOREIGN PATENTS

| Number | Country | Date |
|---|---|---|
| 302,017 | Great Britain | Dec. 13, 1928 |
| 406,824 | Great Britain | Mar. 8, 1931 |
| 463,312 | Great Britain | Mar. 19, 1937 |